J. F. DEMARCHI.
ROLLER BEARING.
APPLICATION FILED MAY 12, 1915.
1,171,102.
Patented Feb. 8, 1916.
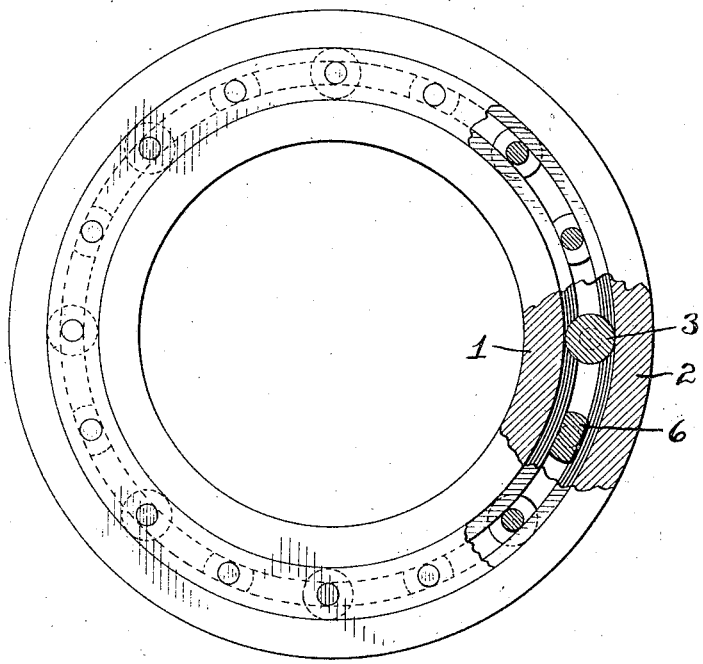
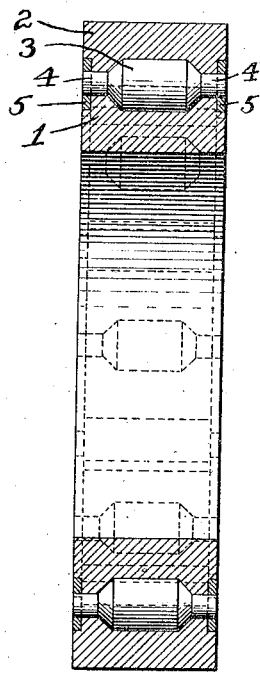
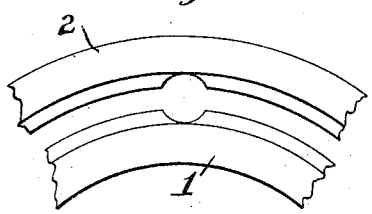
Witness
Geo. C. Cheney
Joseph F. Demarchi, Inventor
By his Attorney
Lewis J. Doolittle

UNITED STATES PATENT OFFICE.

JOSEPH F. DEMARCHI, OF EAST ORANGE, NEW JERSEY.

ROLLER-BEARING.

1,171,102.  Specification of Letters Patent.  Patented Feb. 8, 1916.

Application filed May 12, 1915. Serial No. 27,601.

*To all whom it may concern:*

Be it known that I, JOSEPH F. DEMARCHI, a citizen of the United States, and resident of East Orange, Essex county, New Jersey, have invented certain new and useful Improvements in Roller-Bearings, of which the following is a specification.

This invention relates to a bearing construction of the type known as a roller bearing, the object being to provide a simple and efficient construction for a bearing of this type, in which the rollers may be inserted in position when the bearing members are assembled and also to provide means for holding and guiding the rollers.

Another object of the invention is to provide a bearing which serves not only as a roller bearing but which is also adapted to resist longitudinal movement or end thrust, thus providing a double function for the same.

This invention is an improvement or modification of that described in my application filed Jan. 20, 1915, under Ser. No. 3272.

In carrying out the invention I provide inclosing bearing members formed with retaining walls of peculiar construction which will be described more fully hereinafter.

Means are provided for inserting the rollers in the inclosing members when the same have been assembled in the machine and also means for retaining and guiding the rollers.

Other objects and features of the invention will be explained more fully hereinafter in connection with the illustration of the invention shown in the accompanying drawings, in which like parts in the several views have been given the same reference numerals.

Figure 1 is a side elevation, partly broken away, showing the assembled bearing. Fig. 2 is a sectional view of Fig. 1. Fig. 3 is a side view of a portion of two of the bearing members. Fig. 4 is a detail view of one of the guiding members. Fig. 5 is an end view of Fig. 4.

The bearing comprises an inner inclosing member 1 and an outer inclosing member 2. These members are each provided with a recess having a cylindrical bearing surface, the recess in the bearing member 1 being on its outer surface and the recess on the bearing member 2 on its inner surface, as shown in Fig. 2. These recesses are provided with retaining walls on either side thereof which are formed with angular faces extending outwardly at an angle greater than a right angle, as shown.

The rollers 3 are provided with angular tapered end portions corresponding to the angle of the retaining walls and are also formed with projecting stems from either end, such as 4 and 4', which serve as bearings for guiding the rolls. The projecting stems 4 and 4' from the rolls 3 are received in guide rings 5 and 5' respectively on either side of the bearing, the stems engaging loosely in suitable openings in the rings. These guide rings 5 and 5' are positioned and rotate in complementary annular recesses in the sides of the bearing members 1 and 2 and are preferably flush with the outer surface thereof. The guide rings 5 and 5' are secured together by means of guide members 6, which are positioned alternately with the rollers 3. These guide members 6 are flattened on two sides to slide between the bearing members 1 and 2, as shown in Figs. 1, 4 and 5, and are provided with projecting stems 7 and 7' from either end thereof for securing same to the guide rings 5 and 5', by riveting or otherwise.

The side walls of the bearing members 1 and 2 are cut away in semi-circular form on one side, as shown in Fig. 3, to permit the rolls to be inserted in the bearing when the openings are brought opposite to one another in the position shown in Fig. 3. As the rolls are inserted one by one the projecting stems 4 or 4' are engaged in the guide ring 5 or 5' on the opposite side of the bearing members 1 and 2. The guide members 6 are similarly inserted and positioned alternately with the rolls. After the rolls and guide members have been positioned in the bearing the guide ring on the opposite side is placed in position and engaged with the projecting stems upon the rolls and guide members and upon the latter being secured thereto the bearing is complete.

It will thus be seen that a very simple construction is provided and that frictional contact between the several rolls is avoided, the rolls being guided or held by the guide rings. On account of the angular construction of the ends of the rolls and retaining walls the bearing also serves as a thrust bearing in addition to its ordinary function.

What I claim is:

1. A bearing comprising inclosing members each provided with a recess having a cylindrical face with retaining walls on either side thereof, said members having complementary annular recesses on the sides thereof, a plurality of rollers positioned therein adapted to roll on said flat faces, guide rings positioned in said last mentioned recesses and engaging said rollers, and means for holding said guide rings and rollers in position.

2. A bearing comprising inclosing members each provided with a recess having a cylindrical face with angular retaining walls on either side thereof, said members having complementary annular recesses on the sides thereof, a plurality of rollers positioned therein adapted to roll on said flat faces, guide rings positioned in said last mentioned recesses and engaging said rollers, and means for holding said guide rings and rollers in position.

3. A bearing comprising inclosing members each provided with a recess having a cylindrical face with angular retaining walls on either side thereof, said members having complementary annular recesses on the sides thereof, a plurality of rollers positioned therein adapted to roll on said flat faces, said rollers having angular ends corresponding to said angular retaining walls, guide rings positioned in said last mentioned recesses and engaging said rollers, and means for holding said guide rings and rollers in position.

4. A bearing comprising inclosing members each provided with a recess having a cylindrical face with retaining walls on either side thereof provided with an opening through which rollers may be inserted in said recess, guide rings positioned in said bearing members and closing said opening and engaging said rollers, and means for holding said guide rings and rollers in position.

5. A bearing comprising inclosing members each provided with a recess having a cylindrical face with retaining walls on either side thereof, a plurality of rollers positioned therein adapted to roll on said flat faces, said rollers having projecting stems on either end, guide rings having openings loosely receiving said projecting stems on said rollers, and means for holding said guide rings and rollers in position.

6. A bearing comprising inclosing members each provided with a recess having a cylindrical face with retaining walls on either side thereof, a plurality of rollers positioned therein adapted to roll on said flat faces, said rollers having projecting stems on either end, guide rings having openings loosely receiving said projecting stems on said rollers, and guide members secured to said rings adapted to hold and guide the same.

7. A bearing comprising inclosing members each provided with a recess having a cylindrical face with retaining walls on either side thereof, a plurality of rollers positioned therein adapted to roll on said flat faces, said rollers having projecting stems on either end, guide rings having openings loosely receiving said projecting stems on said rollers, and guide members secured to said rings alternately positioned with said rollers and adapted to hold and guide the same.

8. A bearing comprising inclosing members each provided with a recess having a cylindrical face with retaining walls on either side thereof, a plurality of rollers positioned therein adapted to roll on said flat faces, guide rings positioned in complementary annular recesses on either side of said inclosing members, and guide members rigidly fixed at opposite ends to said guide rings for holding said guide rings and rollers in position.

Signed at the city, county and State of New York, this 1st day of May, 1915.

JOSEPH F. DEMARCHI.

Witnesses:
LEWIS J. DOOLITTLE,
WILLIS H. SIMPSON.